US012128416B2

(12) United States Patent
Fukumori et al.

(10) Patent No.: US 12,128,416 B2
(45) Date of Patent: Oct. 29, 2024

(54) OPERATION AID APPARATUS FOR GRAIN MILLING FACILITY AND GRAIN MILLING FACILITY

(71) Applicant: SATAKE CORPORATION, Tokyo (JP)

(72) Inventors: Takeshi Fukumori, Tokyo (JP); Minoru Koreda, Tokyo (JP); Kazunobu Kajihara, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 722 days.

(21) Appl. No.: 17/424,025

(22) PCT Filed: Jan. 15, 2020

(86) PCT No.: PCT/JP2020/000996
§ 371 (c)(1),
(2) Date: Jul. 19, 2021

(87) PCT Pub. No.: WO2020/162118
PCT Pub. Date: Aug. 13, 2020

(65) Prior Publication Data

US 2022/0097074 A1 Mar. 31, 2022

(30) Foreign Application Priority Data

Feb. 8, 2019 (JP) ................................ 2019-022013

(51) Int. Cl.
*B02B 3/00* (2006.01)
*B02B 5/02* (2006.01)
*B02B 7/02* (2006.01)

(52) U.S. Cl.
CPC .................. *B02B 3/00* (2013.01); *B02B 5/02* (2013.01); *B02B 7/02* (2013.01)

(58) Field of Classification Search
CPC ................ B02B 3/00; B02B 5/02; B02B 7/02
(Continued)

(56) References Cited

U.S. PATENT DOCUMENTS 4,483,244 A * 11/1984 Hosaka ..................... B02B 3/00 241/34
10,740,893 B2 * 8/2020 Hadar ....................... G06T 7/90
(Continued)

FOREIGN PATENT DOCUMENTS

EP 3489883 A1 5/2019
EP 3489884 A1 5/2019
(Continued)

OTHER PUBLICATIONS

Extended European Search Report, counterpart Application No. 20753076.7 issued Sep. 29, 2022.
(Continued)

*Primary Examiner* — Jimmy Chou
(74) *Attorney, Agent, or Firm* — Renner, Otto, Boisselle & Sklar, LLP

(57) ABSTRACT

The present invention is directed to setting an operation parameter of a grain milling machine appropriately according to the characteristics of grain targeted for processing. An operation aid apparatus for a grain milling facility including a grain milling machine and a color sorter includes a first acquisition portion configured to acquire first information regarding characteristics of grain that should be processed in the grain milling facility, and a second acquisition portion configured to acquire second information regarding an evaluation of a sorting result acquired by milling first grain by the grain milling machine and sorting them by the color sorter after that. The second information is associated with the first information regarding the first grain. The operation aid apparatus further includes a setting portion configured to
(Continued)

determine an operation parameter for processing second grain by the grain milling machine based on the first information regarding the second grain that should be newly processed in the grain milling facility and the second information associated with the first information regarding the first grain.

7 Claims, 1 Drawing Sheet

(58) Field of Classification Search
USPC ............................................................ 99/488
See application file for complete search history.

(56) References Cited

U.S. PATENT DOCUMENTS

| | | | | |
|---|---|---|---|---|
| 10,902,575 | B2 * | 1/2021 | Leshem | A01D 41/1208 |
| 2006/0263499 | A1 * | 11/2006 | Satake | A23L 33/17 426/506 |
| 2008/0286435 | A1 * | 11/2008 | Fukumori | A23L 11/01 426/634 |
| 2014/0109774 | A1 * | 4/2014 | Fukumori | A23L 7/10 99/371 |
| 2014/0370174 | A1 * | 12/2014 | Fukumori | A23L 7/196 426/412 |
| 2015/0122924 | A1 * | 5/2015 | Kajihara | B02B 5/02 241/75 |
| 2015/0351431 | A1 * | 12/2015 | Fukumori | A21D 13/047 426/482 |
| 2016/0044950 | A1 * | 2/2016 | Mandriotti Castro | A47J 27/026 426/643 |
| 2019/0083984 | A1 * | 3/2019 | Osakada | B02B 3/02 |

FOREIGN PATENT DOCUMENTS

| | | | | | |
|---|---|---|---|---|---|
| JP | S59-166252 | A | | 9/1984 | |
| JP | 2005-296716 | A | | 10/2005 | |
| JP | 5360374 | B2 | * | 12/2013 | |
| JP | 2018-014028 | A | | 1/2018 | |
| KR | 20140084680 | A | * | 7/2014 | G01N 33/483 |
| WO | WO-2018016509 | A1 | * | 1/2018 | B02B 5/02 |

OTHER PUBLICATIONS

International Search Report for corresponding International Application PCT/JP2020/000996 mailed Apr. 7, 2020.

* cited by examiner

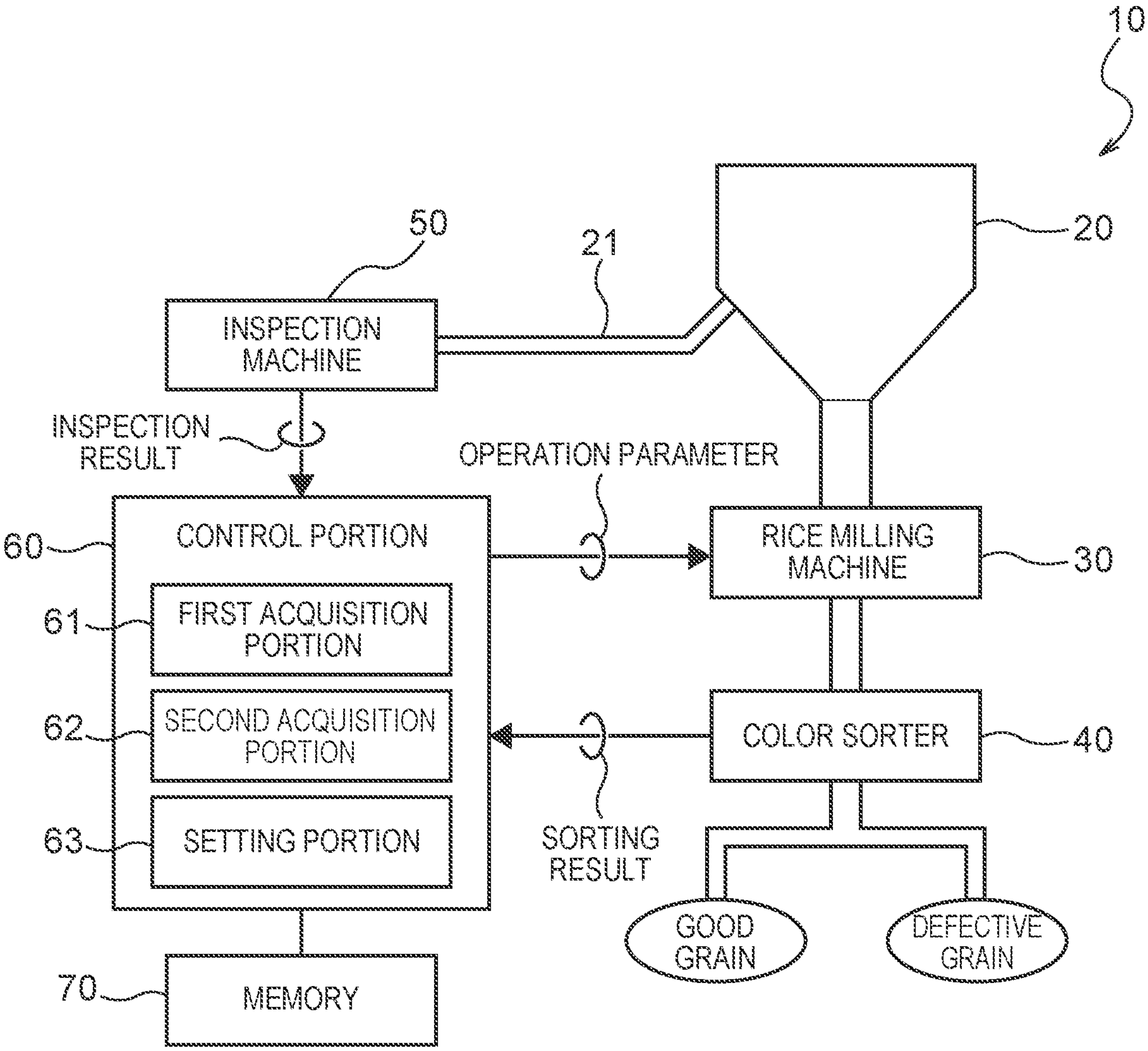
10
20
21
50
INSPECTION MACHINE
INSPECTION RESULT
OPERATION PARAMETER
60
CONTROL PORTION
61
FIRST ACQUISITION PORTION
62
SECOND ACQUISITION PORTION
63
SETTING PORTION
RICE MILLING MACHINE
30
COLOR SORTER
40
SORTING RESULT
GOOD GRAIN
DEFECTIVE GRAIN
70
MEMORY

OPERATION AID APPARATUS FOR GRAIN MILLING FACILITY AND GRAIN MILLING FACILITY

This application is a national phase of International Application No. PCT/JP2020/000996 filed Jan. 15, 2020, which claims priority to Japanese Application No. 2019-022013 filed Feb. 8, 2019, both of which are hereby incorporated herewith in their entireties.

TECHNICAL FIELD

The present invention relates to an operation aid technique for a grain milling facility.

BACKGROUND ART

Conventionally, there has been known a rice milling plant including a rice milling machine and a color sorter (for example, the following patent literatures, PTLs 1 and 2). In such a rice milling plant, brown rice is milled by the rice milling machine, and milled rice is acquired. Then, the milled rice acquired in this manner is sorted by the color sorter. On the color sorter, immature grain and the like are removed as defective grain according to the color of the milled rice.

CITATION LIST

Patent Literature

PTL 1: Japanese Patent Application Public Disclosure No. S59-166252

PTL 2: Japanese Patent Application Public Disclosure No. 2005-296716

SUMMARY OF INVENTION

Technical Problem

In such a rice milling plant, the operations of the rice milling machine and the color sorter are adjusted so as to secure the required quality of the product milled rice in the course of processing the brown rice from acquired raw brown rice into milled rice prepared as a product. The rice milling machine mills the brown rice to make it further white and the color sorter removes the immature grain and the like to secure the required quality of the product milled rice. At this time, if the immature grain is removed by the color sorter as the defective grain extra by an amount larger than a reference value (for example, a reference stipulating that the immature grain is allowed to be mixed in the good grain side by up to 8% of the weight of the good grain) (for example, if the color sorter is set to allow the immature grain to be mixed in the good grain side by an amount smaller than 8% of the weight of the good grain), this ends up causing a reduction in the yield ratio of the rice milling processing and the product processing, thereby highly likely resulting in a reduction in the profit. Then, the adjustment of the processing operation, which requires understanding about the composition and the nature/condition of the brown rice fed as the material and aims to secure the required product quality, tends to rely on the hunch or proficiency of a plant worker. Especially, the operation involving a plurality of plant workers leads to, for example, unevenness in the product quality and a reduction in the yield ratio. Further, a large number of kinds of raw brown rice are handled in the rice milling plant, and this makes it difficult to understand the composition and the nature/condition of the material for each material, and it is hard to say that the adjustment of the processing operation is appropriate. Under these circumstances, it is desirable to set the operation parameter of the rice milling machine appropriately according to the characteristics of rice targeted for the processing. Further, it is desirable to be able to set such an operation parameter without relying on the hunch or proficiency of the plant worker. This problem is not limited to rice milling plants, and is common among any grain milling facility equipped with a grain milling machine, which mills various kinds of grains, and a color sorter, which sorts the grain after the milling.

Solution to Problem

The present invention has been contrived with the aim of solving at least a part of the above-described problems, and can be realized as, for example, the following configurations.

According to a first configuration of the present invention, an operation aid apparatus for a grain milling facility including a grain milling machine and a color sorter is provided. This operation aid apparatus includes a first acquisition portion configured to acquire first information regarding characteristics of grain that should be processed in the grain milling facility, and a second acquisition portion configured to acquire second information regarding an evaluation of a sorting result acquired by milling first grain by the grain milling machine and sorting them by the color sorter after that. The second information is associated with the first information regarding the first grain. The operation aid apparatus further includes a setting portion configured to determine an operation parameter for processing second grain by the grain milling machine based on the first information regarding the second grain that should be newly processed in the grain milling facility and the second information associated with the first information regarding the first grain.

According to this operation aid apparatus, the operation parameter for processing the second grain that should be newly processed by the grain milling machine can be determined suitably according to the characteristics of the second grain based on the characteristics and the evaluation of the sorting result regarding the previously processed first grain. Further, the operation parameter can be set without relying on the hunch or the proficiency of a plant worker.

According to a second configuration of the present invention, in the first configuration, the setting portion determines the operation parameter with use of machine learning. According to this configuration, the operation parameter can be easily automatically determined.

According to a third configuration of the present invention, a grain milling facility is provided. This grain milling facility includes the operation aid apparatus according to the first or second configuration, the grain milling machine, and the color sorter. According to this grain milling facility, similar advantageous effects to the first or second configuration can be achieved.

BRIEF DESCRIPTION OF DRAWINGS

FIG. 1 schematically illustrates the configuration of a grain milling facility according to one embodiment of the present invention.

DESCRIPTION OF EMBODIMENTS

FIG. 1 schematically illustrates the configuration of a rice milling plant 10 as one embodiment of a grain milling facility according to the present invention. The rice milling plant 10 includes a brown rice tank 20, a rice milling machine 30, a color sorter 40, an inspection machine 50, a control portion 60, and a memory 70. The control portion 60 controls the overall operation of each instrument in the rice milling plant 10. Further, the control portion 60 also functions as an operation aid apparatus for the rice milling plant 10 by executing a predetermined program. More specifically, the control portion 60 also functions as a first acquisition portion 61, a second acquisition portion 62, and a setting portion 63. The details of these functional portions will be described below.

Brown rice that should be processed in the rice milling plant 10 is supplied to the brown rice tank 20. A branch pipe 21 is connected to the brown rice tank 20. The end portion of the branch pipe 21 opposite from the brown rice tank 20 is connected to the inspection machine 50. The branch pipe 21 is connected on a further upstream side of the brown rice tank 20 and is also configured as a pipe small in diameter, and therefore most of the brown rice supplied to the brown rice tank 20 is supplied to the rice milling machine 30 while a part of the brown rice is supplied to the inspection machine 50.

The inspection machine 50 is provided to acquire first information regarding the characteristics of the brown rice that should be processed in the rice milling plant 10. The inspection machine 50 may include, for example, at least one of a rice grain palatability meter and a grain grader. The rice grain palatability meter may measure the palatability value, the amylose content, the protein content, the fatty acid level, the moisture, and/or the like as the characteristics of the brown rice. The grain grader may measure the rate of perfect grain, the grain thickness, the rate of immature grain, the rate of damaged grain, the rate of dead rice, the rate of colored grain, the rate of cracked grain, and/or the like as the characteristics of the brown rice. The first information acquired by the inspection machine 50 (i.e., the result of the inspection by the inspection machine 50) is acquired by the first acquisition portion 61 and is stored into the memory 70.

The brown rice supplied to the rice milling machine 30 is milled by the rice milling machine 30. The milled rice acquired from the milling by the rice milling machine 30 is supplied to the color sorter 40. The color sorter 40 optically detects the color of the milled rice, and sorts the milled rice into good grain and defective grain based on the result of this detection. Further, the color sorter 40 calculates second information regarding an evaluation of the result of the sorting by the color sorter 40. The second information may be, for example, the rate of immature grain. In this case, whether each grain is an immature grain may be determined based on whether the color tone value at each pixel in image data of each grain falls within a predetermined range corresponding to an immature grain or whether the ratio of pixels having color tone values within this predetermined range to all the pixels forming the image data of one grain is equal to or higher than a reference value.

Further or alternatively, the milling degree of the milled rice may be calculated based on data of optical detection information detected by the color sorter 40. More specifically, the color sorter 40 includes a light source, an optical detector for reflected light or transmitted light, and a calculation portion. Therefore, when the milled rice passes through the optical detector in the color sorter 40, the amount of light reflected on and the amount of light transmitted through the milled rice can be acquired. Then, the calculation portion of the color sorter 40 calibrates the amount of reflected light or the amount of transmitted light with use of an existing milling degree meter. The reflectance and the transmittance are calculated in the form of the ratios thereof to 100% of the reflectance and the transmittance set at the time of this calibration, respectively. As a result, the milling degree can be calculated based on the amount of light reflected on and the amount of light transmitted through the milled rice that are acquired by the color sorter. Further, the result of the sorting by the color sorter 40 may be handled as a variable factor during the operation.

The second information acquired by the color sorter 40 (i.e., the evaluation of the sorting result) is acquired by the second acquisition portion 62 and is stored into the memory 70 in association with the first information acquired by the first acquisition portion 61.

In this manner, every time brown rice in one lot is processed in the rice milling plant 10, the first acquisition portion 61 and the second acquisition portion 62 gradually accumulate the characteristics thereof (the first information) and the evaluation of the sorting result (the second information) in association with each other.

When new brown rice is processed in the rice milling plant 10, the setting portion 63 determines an operation parameter for processing the brown rice that should be newly processed by the rice milling machine 30 (for example, the flow rate of the brown rice, the pressure of a resistance lid, and/or the like) based on the first information acquired by the first acquisition portion 61 regarding this brown rice that should be newly processed and the second information accumulated in the memory 70 in association with the first information (i.e., based on the second information associated with the first information regarding the brown rice previously processed in the rice milling plant 10). The operation parameter is determined so as to be able to acquire the best evaluation of the sorting result (for example, the highest yield ratio) according to the characteristics of this brown rice that should be newly processed.

Artificial intelligence (AI) that learns from a logical deduction or a previous experience may be used for this determination of the operation parameter. In this case, machine learning in a broad sense may be used. Various known methods and algorithms may be used, and examples thereof include the design of experiments, the neural network, the deep learning, the fuzzy inference, the multivariate analysis (the Mahalanobis' generalized distance, the multiple regression analysis, and the like), the sparse modeling, and the support vector machine.

The operation parameter determined in this manner may be automatically determined by the control portion 60. Alternatively, the determined operation parameter may be displayed on a monitor, and a plant worker may confirm this display content and set the operation parameter manually.

According to the above-described rice milling plant 10, the operation parameter for processing the brown rice that should be newly processed by the rice milling machine 30 can be determined suitably according to the characteristics of the brown rice that should be newly processed based on the characteristics and the evaluation of the sorting result regarding the previously processed brown rice. Further, the operation parameter can be set without relying on the hunch or the proficiency of the plant worker.

Having described several embodiments of the present invention, the above-described embodiments of the invention are intended to facilitate the understanding of the present invention, and are not intended to limit the present invention thereto. The present invention can be modified or improved without departing from the spirit of the present invention, and includes equivalents thereof. Further, the individual components described in the claims and the specification can be combined or omitted within a range that allows them to remain capable of achieving at least a part of the above-described objects or producing at least a part of the above-described advantageous effects.

For example, the first acquisition portion 61, the second acquisition portion 62, and the setting portion 63 may be provided in a server in a communication network (for example, a LAN, the Internet, or the like) that is communicably connected to the control portion 60. In this case, the first information and the second information may be stored in the server. Further, the control portion 60 may transmit the first information regarding the brown rice that should be newly processed to the server and receive the operation parameter from the server. Alternatively, only the function of storing the first information and the second information may be disposed in the server.

Further, the first acquisition portion 61 and the second acquisition portion 62 are not limited to acquiring the first information and the second information with respect to one rice milling plant 10, and may acquire the first information and the second information with respect to a plurality of rice milling plants 10. In this case, the first information and the second information can be accumulated with respect to the plurality of rice milling plants 10. The setting portion 63 may determine the operation parameter for the rice milling machine 30 in an arbitrary single rice milling plant 10 among the plurality of rice milling plants 10 based on the first information of brown rice that should be newly processed in this single rice milling plant 10, and the first information and the second information accumulated in the memory or the server with respect to the plurality of rice milling plants 10.

Further, the first information, the second information, and third information regarding the specifications of each rice milling plant 10 may be stored in association with one another. In this case, the setting portion 63 may determine the operation parameter for the rice milling machine 30 in an arbitrary single rice milling plant 10 among the plurality of rice milling plants 10 based on the first information of brown rice that should be newly processed in this single rice milling plant 10, the third information with respect to this single rice milling plant 10, and the first information to the third information accumulated in the memory or the server with respect to the plurality of rice milling plants 10.

The above-described embodiments are applicable to any grain milling facility equipped with a grain milling machine and a color sorter without being limited to the rice milling plant.

The present application claims priority under the Paris Convention to Japanese Patent Application No. 2019-022013 filed on Feb. 8, 2019. The entire disclosure of Japanese Patent Application No. 2019-022013 filed on Feb. 8, 2019 including the specification, the claims, the drawings, and the abstract is incorporated herein by reference in its entirety.

REFERENCE SIGNS LIST

10 rice milling plant
20 brown rice tank
21 branch pipe
30 rice milling machine
40 color sorter
50 inspection machine
60 control portion
61 first acquisition portion
62 second acquisition portion
63 setting portion
70 memory

The invention claimed is:

1. An operation aid apparatus for a grain milling facility including a rice milling machine and a color sorter, the grain milling facility including a brown rice tank configured to supply brown rice to the rice milling machine, the brown rice tank being connected with a branch pipe, so that most of the brown rice supplied to the brown rice tank is supplied to the rice milling machine while a part of the brown rice is supplied to the branch pipe, the operation aid apparatus comprising: an inspection machine connected to an end portion of the branch pipe opposite from the brown rice tank and supplied with a part of the brown rice through the branch pipe, the inspection machine being configured to measure first information regarding characteristics of the brown rice that should be processed in the grain milling facility, a first acquisition portion configured to acquire the first information acquired by the inspection machine;

a second acquisition portion configured to acquire second information regarding an evaluation of a sorting result acquired by milling first brown rice by the rice milling machine and sorting them by the color sorter after that, the second information being associated with the first information regarding the first brown rice; and a setting portion configured to determine an operation parameter for processing second brown rice by the rice milling machine based on the first information regarding the second brown rice that should be newly processed in the grain milling facility and the second information associated with the first information regarding the first brown rice, the first acquisition portion and the second acquisition portion being configured to gradually accumulate the first information and the second information in association with each other every time brown rice in one lot is processed in the grain milling facility, and the setting portion being configured to determine the operation parameter so as to be able to acquire a highest yield ratio.

2. The operation aid apparatus according to claim 1, wherein the setting portion determines the operation parameter with use of machine learning.

3. The operation aid apparatus according to claim 1, wherein the inspection machine includes at least one of a rice grain palatability meter and a grain grader, and wherein the first information regarding the characteristics of the brown rice that should be processed in the grain milling facility is acquired by the inspection machine.

4. The operation aid apparatus according to claim 1, wherein the setting portion is configured to acquire optical detection information by milling brown rice that should be processed in the grain milling facility by the rice milling machine and sorting them by the color sorter after that, and determine an operation parameter for processing second brown rice that should be newly processed in the grain milling facility by the rice milling machine based on the optical detection information so as to be able to acquire a highest yield ratio.

5. The operation aid apparatus according to claim 4, wherein the optical detection information is a brown rice milling degree acquired by sorting the brown rice by the color sorter, and wherein the setting portion determines the operation parameter for processing the second brown rice that should be newly processed in the grain milling facility by the rice milling machine based on the brown rice milling degree.

6. The operation aid apparatus according to claim 1, further comprising:

a memory configured to store the first information acquired by the first acquisition portion and store the second information acquired by the second acquisition portion in association with the first information acquired by the first acquisition portion.

7. A grain milling facility comprising:

the operation aid apparatus according to claim 1;

the rice milling machine; and the color sorter.

* * * * *